United States Patent
Nazarpoor (10) Patent No.: US 9,511,353 B2
(45) Date of Patent: Dec. 6, 2016

(54) FIRING (CALCINATION) PROCESS AND METHOD RELATED TO METALLIC SUBSTRATES COATED WITH ZPGM CATALYST

(71) Applicant: Clean Diesel Technologies, Inc., Oxnard, CA (US)

(72) Inventor: Zahra Nazarpoor, Camarillo, CA (US)

(73) Assignee: Clean Diesel Technologies, Inc. (CDTI), Oxnard, CA (US)

(*) Notice: Subject to any disclaimer, the term of this patent is extended or adjusted under 35 U.S.C. 154(b) by 341 days.

(21) Appl. No.: 13/912,011

(22) Filed: Jun. 6, 2013

(65) Prior Publication Data

US 2014/0274663 A1    Sep. 18, 2014

Related U.S. Application Data

(60) Provisional application No. 61/791,721, filed on Mar. 15, 2013, provisional application No. 61/791,838, (Continued)

(51) Int. Cl.
*B01J 21/04* (2006.01)
*B01J 21/08* (2006.01)
(Continued)

(52) U.S. Cl.
CPC .......... *B01J 23/83* (2013.01); *B01D 53/944* (2013.01); *B01D 53/945* (2013.01); *B01J 23/002* (2013.01);
(Continued)

(58) Field of Classification Search
CPC ......... B01J 21/04; B01J 21/063; B01J 21/066; B01J 21/08; B01J 21/12; B01J 23/005; B01J 23/20; B01J 23/72; B01J 23/83; B01J 23/8474; B01J 37/0215; B01J 37/0228; B01J 37/0244; B01J 37/08; B01J 37/14
(Continued)

(56) References Cited

U.S. PATENT DOCUMENTS

3,284,370 A    11/1966    Alan et al.
3,473,987 A    10/1969    Sowards
(Continued)

FOREIGN PATENT DOCUMENTS

CH    644637 A5    8/1984
CN    102172527    9/2011
(Continued)

OTHER PUBLICATIONS

Alini, S. et al., Development of new catalysts for N2O-decomposition from adipic acid plant, Applied Catalysis B: Environmental, 70, (2007) 323-329.
(Continued)

*Primary Examiner* — Patricia L Hailey
(74) *Attorney, Agent, or Firm* — Alston & Bird LLP (57) ABSTRACT

The effect of firing (calcination) cycle on metallic substrates in ZPGM catalyst systems is disclosed. ZPGM catalyst samples with washcoat and overcoat are separately fired in a normal, slow and fast firing cycles to determine the optimal firing cycling that may provide an enhanced catalyst performance, as well as the minimal loss of washcoat adhesion from the samples.

20 Claims, 6 Drawing Sheets

Related U.S. Application Data filed on Mar. 15, 2013, provisional application No. 61/791,963, filed on Mar. 15, 2013, provisional application No. 61/792,071, filed on Mar. 15, 2013, provisional application No. 61/792,215, filed on Mar. 15, 2013.

(51) Int. Cl.

| | | |
|---|---|---|
| *B01J 21/12* | (2006.01) | |
| *B01J 23/20* | (2006.01) | |
| *B01J 23/72* | (2006.01) | |
| *B01J 37/08* | (2006.01) | |
| *B01J 37/14* | (2006.01) | |
| *B01J 23/83* | (2006.01) | |
| *B01J 37/02* | (2006.01) | |
| *B01J 23/00* | (2006.01) | |
| *B01J 23/68* | (2006.01) | |
| *B01D 53/94* | (2006.01) | |
| *B01J 37/03* | (2006.01) | |
| *B01J 29/06* | (2006.01) | |

(52) U.S. Cl.
CPC .......... *B01J 23/688* (2013.01); *B01J 37/0244* (2013.01); *B01D 2255/104* (2013.01); *B01D 2255/2065* (2013.01); *B01D 2255/2073* (2013.01); *B01D 2255/20715* (2013.01); *B01D 2255/20761* (2013.01); *B01D 2255/65* (2013.01); *B01D 2255/908* (2013.01); *B01D 2255/9022* (2013.01); *B01J 29/06* (2013.01); *B01J 37/03* (2013.01); *B01J 2523/00* (2013.01); *Y02T 10/22* (2013.01)

(58) Field of Classification Search
USPC .............. 502/244, 246, 304, 345, 346, 351, 353,502/439, 524
See application file for complete search history.

(56) References Cited

U.S. PATENT DOCUMENTS

| | | | |
|---|---|---|---|
| 3,493,325 A | 2/1970 | Roth | |
| 3,896,616 A | 7/1975 | Keith et al. | |
| 3,904,553 A | 9/1975 | Campbell et al. | |
| 4,029,738 A | 6/1977 | Courty et al. | |
| 4,062,810 A | 12/1977 | Vogt et al. | |
| 4,113,921 A | 9/1978 | Goldstein et al. | |
| 4,188,309 A | 2/1980 | Volker et al. | |
| 4,199,328 A | 4/1980 | Cole et al. | |
| 4,261,862 A * | 4/1981 | Kinoshita et al. | 502/304 |
| 4,274,981 A | 6/1981 | Suzuki et al. | |
| 4,297,150 A | 10/1981 | Sims et al. | |
| 4,297,328 A | 10/1981 | Ritscher et al. | |
| 4,414,023 A | 11/1983 | Aggen et al. | |
| 4,629,472 A | 12/1986 | Haney, III et al. | |
| 4,661,329 A | 4/1987 | Suzuki et al. | |
| 4,673,556 A | 6/1987 | McCabe et al. | |
| 4,790,982 A | 12/1988 | Yoo et al. | |
| 4,797,329 A | 1/1989 | Kilbane et al. | |
| 4,885,269 A | 12/1989 | Cyron | |
| 4,891,050 A | 1/1990 | Bowers et al. | |
| 4,892,562 A | 1/1990 | Bowers et al. | |
| 4,906,443 A | 3/1990 | Gandhi et al. | |
| 5,034,020 A | 7/1991 | Epperly et al. | |
| 5,063,193 A | 11/1991 | Bedford et al. | |
| 5,157,007 A | 10/1992 | Domesle et al. | |
| 5,162,284 A | 11/1992 | Soled et al. | |
| 5,168,836 A | 12/1992 | Kraus | |
| 5,175,132 A | 12/1992 | Ketcham et al. | |
| 5,182,249 A | 1/1993 | Wang et al. | |
| 5,203,166 A | 4/1993 | Miller | |
| 5,238,898 A | 8/1993 | Han et al. | |
| 5,266,083 A | 11/1993 | Peter-Hoblyn et al. | |
| 5,364,517 A | 11/1994 | Dieckmann et al. | |
| 5,371,056 A | 12/1994 | Leyrer et al. | |
| 5,404,841 A | 4/1995 | Valentine | |
| 5,501,714 A | 3/1996 | Valentine et al. | |
| 5,535,708 A | 7/1996 | Valentine | |
| 5,580,553 A | 12/1996 | Nakajima | |
| 5,584,894 A | 12/1996 | Peter-Hoblyn et al. | |
| 5,658,543 A | 8/1997 | Yoshida et al. | |
| 5,693,106 A | 12/1997 | Peter-Hoblyn et al. | |
| 5,708,233 A | 1/1998 | Ochi et al. | |
| 5,721,188 A | 2/1998 | Sung et al. | |
| 5,732,548 A | 3/1998 | Peter-Hoblyn et al. | |
| 5,743,922 A | 4/1998 | Peter-Hoblyn et al. | |
| 5,747,410 A | 5/1998 | Muramatsu et al. | |
| 5,749,928 A | 5/1998 | Epperly et al. | |
| 5,809,774 A | 9/1998 | Peter-Hoblyn et al. | |
| 5,809,775 A | 9/1998 | Tarabulski et al. | |
| 5,819,529 A | 10/1998 | Peter-Hoblyn et al. | |
| 5,868,421 A | 2/1999 | Eyrainer | |
| 5,879,645 A | 3/1999 | Park et al. | |
| 5,898,015 A | 4/1999 | Yokoi et al. | |
| 5,921,080 A | 7/1999 | Ulmet et al. | |
| 5,924,280 A | 7/1999 | Tarabulski | |
| 5,939,354 A | 8/1999 | Golden | |
| 5,965,099 A | 10/1999 | Hartweg et al. | |
| 5,968,462 A | 10/1999 | Suzuki | |
| 5,968,464 A | 10/1999 | Peter-Hoblyn et al. | |
| 5,976,475 A | 11/1999 | Peter-Hoblyn et al. | |
| 5,977,017 A | 11/1999 | Golden | |
| 6,003,303 A | 12/1999 | Peter-Hoblyn et al. | |
| 6,023,928 A | 2/2000 | Peter-Hoblyn et al. | |
| 6,051,040 A | 4/2000 | Peter-Hoblyn et al. | |
| 6,063,350 A | 5/2000 | Tarabulski et al. | |
| 6,124,130 A | 9/2000 | Olson | |
| 6,129,834 A | 10/2000 | Peters et al. | |
| 6,203,770 B1 | 3/2001 | Peter-Hoblyn et al. | |
| 6,232,253 B1 | 5/2001 | Narula et al. | |
| 6,279,603 B1 | 8/2001 | Czarnik et al. | |
| 6,293,096 B1 | 9/2001 | Khair et al. | |
| 6,352,955 B1 | 3/2002 | Golden | |
| 6,361,754 B1 | 3/2002 | Peter-Hoblyn et al. | |
| 6,372,686 B1 | 4/2002 | Golden | |
| 6,395,244 B1 | 5/2002 | Hartweg et al. | |
| 6,444,178 B1 | 9/2002 | Haratweg et al. | |
| 6,468,941 B1 | 10/2002 | Bortun et al. | |
| 6,531,425 B2 | 3/2003 | Golden | |
| 6,576,587 B2 | 6/2003 | Labarge et al. | |
| 6,605,264 B2 | 8/2003 | Bortun et al. | |
| 6,624,113 B2 | 9/2003 | Labarge et al. | |
| 6,632,557 B1 | 10/2003 | Curelop et al. | |
| 6,652,829 B2 | 11/2003 | Barnes et al. | |
| 6,696,389 B1 | 2/2004 | Boegner et al. | |
| 6,747,180 B2 | 6/2004 | Ostgard et al. | |
| 6,774,080 B2 | 8/2004 | LaBarge et al. | |
| 6,858,193 B2 | 2/2005 | Ruwisch et al. | |
| 6,915,629 B2 | 7/2005 | Szymkowics | |
| 6,938,411 B2 | 9/2005 | Hoffmann et al. | |
| 6,948,926 B2 | 9/2005 | Valentine et al. | |
| 7,014,825 B2 | 3/2006 | Golden | |
| 7,129,194 B2 | 10/2006 | Baca et al. | |
| 7,374,729 B2 | 5/2008 | Chen et al. | |
| 7,393,809 B2 | 7/2008 | Kim | |
| 7,485,273 B2 | 2/2009 | Gandhi et al. | |
| 7,563,744 B2 | 7/2009 | Klein et al. | |
| 7,576,029 B2 | 8/2009 | Saito et al. | |
| 7,641,875 B1 | 1/2010 | Golden | |
| 7,749,472 B2 | 7/2010 | Chen et al. | |
| 7,772,147 B2 | 8/2010 | Collier et al. | |
| 7,785,544 B2 | 8/2010 | Alward et al. | |
| 7,803,338 B2 | 9/2010 | Socha et al. | |
| 7,875,250 B2 | 1/2011 | Nunan | |
| 7,875,573 B2 | 1/2011 | Beutel et al. | |
| 7,943,104 B2 | 5/2011 | Kozlov et al. | |
| 8,080,494 B2 | 12/2011 | Yasuda et al. | |
| 8,148,295 B2 | 4/2012 | Augustine | |
| 8,158,551 B2 | 4/2012 | Verdier et al. | |
| 8,168,125 B2 | 5/2012 | Choi | |
| 8,242,045 B2 | 8/2012 | Kulkarni et al. | |
| 8,318,629 B2 | 11/2012 | Alive et al. | |

(56) References Cited

U.S. PATENT DOCUMENTS

| | | |
|---|---|---|
| 8,802,582 B2 | 8/2014 | Malyala et al. |
| 8,845,987 B1 | 9/2014 | Nazarpoor et al. |
| 8,853,121 B1* | 10/2014 | Nazarpoor et al. .......... 502/324 |
| 8,858,903 B2 | 10/2014 | Nazarpoor |
| 2001/0001354 A1 | 5/2001 | Peter-Hoblyn et al. |
| 2002/0001554 A1 | 1/2002 | Czarnik et al. |
| 2002/0042341 A1 | 4/2002 | Golden |
| 2002/0114746 A1 | 8/2002 | Roark et al. |
| 2002/0131914 A1 | 9/2002 | Sung |
| 2003/0092566 A1 | 5/2003 | Inoue et al. |
| 2003/0109047 A1 | 6/2003 | Valentine |
| 2003/0126789 A1 | 7/2003 | Valentine et al. |
| 2003/0148235 A1 | 8/2003 | Valentine et al. |
| 2003/0185722 A1 | 10/2003 | Toyoda |
| 2003/0198582 A1 | 10/2003 | Golden |
| 2003/0221360 A1 | 12/2003 | Brown et al. |
| 2004/0018939 A1 | 1/2004 | Chigapov et al. |
| 2004/0033175 A1 | 2/2004 | Ohno et al. |
| 2004/0048125 A1 | 3/2004 | Curlop et al. |
| 2004/0087439 A1 | 5/2004 | Hwang et al. |
| 2004/0098905 A1 | 5/2004 | Valentine et al. |
| 2004/0151647 A1 | 8/2004 | Wanninger et al. |
| 2004/0166035 A1 | 8/2004 | Noda et al. |
| 2004/0172876 A1 | 9/2004 | Sprague et al. |
| 2004/0254062 A1 | 12/2004 | Crocker et al. |
| 2005/0095188 A1 | 5/2005 | Matsumoto et al. |
| 2005/0132674 A1 | 6/2005 | Toyoda et al. |
| 2005/0145827 A1 | 7/2005 | McCabe et al. |
| 2005/0160663 A1 | 7/2005 | Valentine |
| 2005/0160724 A1 | 7/2005 | Valentine et al. |
| 2005/0164139 A1 | 7/2005 | Valentine et al. |
| 2005/0188605 A1 | 9/2005 | Valentine et al. |
| 2005/0197244 A1 | 9/2005 | L'vovich et al. |
| 2005/0207956 A1 | 9/2005 | Vierheilig |
| 2005/0217751 A1 | 10/2005 | Valentine et al. |
| 2005/0227867 A1 | 10/2005 | Chen et al. |
| 2005/0265920 A1 | 12/2005 | Ercan et al. |
| 2006/0081922 A1 | 4/2006 | Golden |
| 2006/0100097 A1 | 5/2006 | Chigapov et al. |
| 2006/0120936 A1 | 6/2006 | Alive et al. |
| 2006/0166816 A1 | 7/2006 | Zhang et al. |
| 2006/0223694 A1 | 10/2006 | Gandhi et al. |
| 2006/0228283 A1 | 10/2006 | Malyala et al. |
| 2006/0254535 A1 | 11/2006 | Valentine et al. |
| 2006/0260185 A1 | 11/2006 | Valentine et al. |
| 2006/0292342 A1 | 12/2006 | Ohno et al. |
| 2007/0015656 A1 | 1/2007 | Valentine et al. |
| 2007/0209272 A1 | 9/2007 | Valentine |
| 2007/0283681 A1 | 12/2007 | Makkee et al. |
| 2008/0072705 A1* | 3/2008 | Chaumonnot et al. ......... 75/338 |
| 2008/0075646 A1 | 3/2008 | Mussmann et al. |
| 2008/0119353 A1 | 5/2008 | Jia et al. |
| 2008/0125308 A1 | 5/2008 | Fujdala et al. |
| 2008/0166282 A1 | 7/2008 | Golden et al. |
| 2008/0190099 A1 | 8/2008 | Yezerets et al. |
| 2008/0210184 A1 | 9/2008 | Valentine et al. |
| 2008/0226524 A1 | 9/2008 | Alive et al. |
| 2009/0004083 A1 | 1/2009 | Valentine et al. |
| 2009/0134365 A1 | 5/2009 | Sasaki et al. |
| 2009/0220697 A1 | 9/2009 | Addiego |
| 2009/0274903 A1 | 11/2009 | Addiego |
| 2009/0304566 A1 | 12/2009 | Golden et al. |
| 2009/0324468 A1 | 12/2009 | Golden et al. |
| 2009/0324469 A1* | 12/2009 | Golden et al. ................ 423/212 |
| 2009/0324470 A1 | 12/2009 | Alamdari et al. |
| 2010/0062293 A1 | 3/2010 | Triantafyllopoulos et al. |
| 2010/0111796 A1 | 5/2010 | Caudle et al. |
| 2010/0152032 A1 | 6/2010 | Galligan |
| 2010/0168449 A1 | 7/2010 | Grey et al. |
| 2010/0180581 A1 | 7/2010 | Grubert et al. |
| 2010/0184590 A1 | 7/2010 | Althofer et al. |
| 2010/0193104 A1 | 8/2010 | Ryu et al. |
| 2010/0229533 A1 | 9/2010 | Li et al. |
| 2010/0233045 A1 | 9/2010 | Kim et al. |
| 2010/0240525 A1* | 9/2010 | Golden et al. .................. 502/65 |
| 2010/0266473 A1 | 10/2010 | Chen et al. |
| 2010/0290964 A1 | 11/2010 | Southward et al. |
| 2010/0293929 A1 | 11/2010 | Zhan et al. |
| 2010/0316545 A1 | 12/2010 | Alive et al. |
| 2010/0316547 A1 | 12/2010 | Justice et al. |
| 2011/0053763 A1 | 3/2011 | Verdier et al. |
| 2011/0150742 A1 | 6/2011 | Han et al. |
| 2011/0239626 A1 | 10/2011 | Makkee et al. |
| 2012/0015801 A1 | 1/2012 | Deprez et al. |
| 2012/0039775 A1 | 2/2012 | Schirmeister et al. |
| 2012/0183447 A1 | 7/2012 | Kwan et al. |
| 2013/0012378 A1 | 1/2013 | Meyer et al. |
| 2013/0058848 A1 | 3/2013 | Nunan et al. |
| 2013/0115144 A1 | 5/2013 | Golden et al. |
| 2013/0130032 A1 | 5/2013 | Kuo et al. |
| 2013/0172177 A1 | 7/2013 | Domke et al. |
| 2013/0189173 A1 | 7/2013 | Hilgendorff |
| 2013/0236380 A1 | 9/2013 | Golden et al. |
| 2013/0323145 A1 | 12/2013 | Tran et al. |
| 2014/0271384 A1 | 9/2014 | Nazarpoor et al. |
| 2014/0271387 A1 | 9/2014 | Nazarpoor |
| 2014/0271388 A1 | 9/2014 | Nazarpoor et al. |
| 2014/0271390 A1* | 9/2014 | Nazarpoor .................... 422/177 |
| 2014/0271391 A1 | 9/2014 | Nazarpoor |
| 2014/0271392 A1 | 9/2014 | Nazarpoor |
| 2014/0271393 A1 | 9/2014 | Nazarpoor |
| 2014/0271425 A1* | 9/2014 | Nazarpoor ................. 423/213.2 |
| 2014/0274662 A1 | 9/2014 | Nazarpoor |
| 2014/0274674 A1 | 9/2014 | Nazarpoor et al. |
| 2014/0274675 A1 | 9/2014 | Nazarpoor |
| 2014/0274677 A1 | 9/2014 | Nazarpoor |
| 2014/0274678 A1 | 9/2014 | Nazarpoor |
| 2014/0298714 A1 | 10/2014 | Sprague |
| 2014/0301906 A1 | 10/2014 | Hatfield |
| 2014/0301909 A1 | 10/2014 | Nazarpoor |
| 2014/0301926 A1 | 10/2014 | Hatfield |
| 2014/0301931 A1* | 10/2014 | Nazarpoor ................. 423/245.1 |
| 2014/0302983 A1 | 10/2014 | Nazarpoor |
| 2014/0334978 A1 | 11/2014 | Hatfield |
| 2014/0334989 A1 | 11/2014 | Nazarpoor et al. |
| 2014/0334990 A1 | 11/2014 | Nazarpoor |
| 2014/0335625 A1 | 11/2014 | Hatfield |
| 2014/0335626 A1 | 11/2014 | Hatfield |
| 2014/0336038 A1 | 11/2014 | Nazarpoor et al. |
| 2014/0336044 A1* | 11/2014 | Nazarpoor et al. ........... 502/303 |
| 2014/0336045 A1 | 11/2014 | Nazarpoor et al. |
| 2014/0356243 A1 | 12/2014 | Nazarpoor |
| 2014/0357475 A1 | 12/2014 | Nazarpoor et al. |
| 2014/0357479 A1* | 12/2014 | Nazarpoor et al. ........... 502/302 |
| 2014/0360164 A1 | 12/2014 | Sprague et al. |
| 2014/0364303 A1 | 12/2014 | Hatfield |
| 2015/0004709 A1 | 1/2015 | Nazarpoor |
| 2015/0005157 A1 | 1/2015 | Nazarpoor et al. |
| 2015/0005158 A1 | 1/2015 | Nazarpoor et al. |
| 2015/0005159 A1 | 1/2015 | Nazarpoor |
| 2015/0017082 A1 | 1/2015 | Nazarpoor |
| 2015/0018202 A1 | 1/2015 | Nazarpoor et al. |
| 2015/0018203 A1 | 1/2015 | Nazarpoor et al. |
| 2015/0018204 A1 | 1/2015 | Nazarpoor et al. |
| 2015/0018205 A1 | 1/2015 | Nazarpoor et al. |
| 2015/0031268 A1 | 1/2015 | Waites et al. |
| 2015/0050742 A1 | 2/2015 | Nazarpoor |
| 2015/0051067 A1 | 2/2015 | Nazarpoor et al. |
| 2015/0105242 A1 | 4/2015 | Nazarpoor et al. |
| 2015/0105243 A1 | 4/2015 | Nazarpoor et al. |
| 2015/0105245 A1 | 4/2015 | Nazarpoor et al. |
| 2015/0105246 A1 | 4/2015 | Nazarpoor et al. |
| 2015/0105247 A1 | 4/2015 | Nazarpoor et al. |
| 2015/0147239 A1 | 5/2015 | Launois et al. |
| 2015/0147251 A1 | 5/2015 | Nazarpoor et al. |
| 2015/0148215 A1 | 5/2015 | Nazarpoor |
| 2015/0148216 A1 | 5/2015 | Nazarpoor |
| 2015/0148220 A1 | 5/2015 | Nazarpoor |
| 2015/0148222 A1 | 5/2015 | Nazarpoor |
| 2015/0148223 A1 | 5/2015 | Nazarpoor et al. |
| 2015/0148224 A1 | 5/2015 | Nazarpoor et al. |
| 2015/0148225 A1 | 5/2015 | Nazarpoor et al. |
| 2015/0182951 A1 | 7/2015 | Nazarpoor |
| 2015/0182954 A1 | 7/2015 | Nazarpoor |

(56) References Cited

U.S. PATENT DOCUMENTS

| | | | |
|---|---|---|---|
| 2015/0196902 A1 | 7/2015 | Golden et al. | |
| 2015/0238940 A1 | 8/2015 | Nazarpoor et al. | |
| 2015/0238941 A1 | 8/2015 | Nazarpoor et al. | |
| 2015/0258496 A1 | 9/2015 | Hatfield et al. | |
| 2015/0290627 A1 | 10/2015 | Nazarpoor et al. | |
| 2015/0290630 A1 | 10/2015 | Nazarpoor | |
| 2015/0352494 A1 | 12/2015 | Hatfield et al. | |
| 2015/0352529 A1 | 12/2015 | Nazarpoor et al. | |
| 2015/0352531 A1 | 12/2015 | Hatfield et al. | |
| 2015/0352532 A1 | 12/2015 | Hatfield et al. | |
| 2015/0352533 A1 | 12/2015 | Hatfield et al. | |
| 2016/0023188 A1 | 1/2016 | Nazarpoor | |
| 2016/0030885 A1 | 2/2016 | Hatfield | |
| 2016/0047751 A1 | 2/2016 | Pless et al. | |
| 2016/0082422 A1 | 3/2016 | Nazarpoor | |
| 2016/0121304 A1 | 5/2016 | Nazarpoor | |
| 2016/0121308 A1 | 5/2016 | Nazarpoor et al. | |
| 2016/0121309 A1 | 5/2016 | Nazarpoor et al. | |
| 2016/0136617 A1 | 5/2016 | Nazarpoor et al. | |
| 2016/0136618 A1 | 5/2016 | Nazarpoor et al. | |
| 2016/0136619 A1 | 5/2016 | Nazarpoor et al. | |
| 2016/0136620 A1 | 5/2016 | Nazarpoor et al. | |
| 2016/0136621 A1 | 5/2016 | Nazarpoor et al. | |

FOREIGN PATENT DOCUMENTS

| | | | |
|---|---|---|---|
| CN | 102371153 | 3/2012 | |
| EP | 0022349 | 1/1981 | |
| EP | 0450897 | 10/1991 | |
| EP | 0541271 | 5/1993 | |
| EP | 0605142 | 7/1994 | |
| EP | 0 814 241 | 12/1997 | |
| EP | 1121981 | 8/2001 | |
| EP | 1232790 A1 | 8/2002 | |
| EP | 1 256 382 | 11/2002 | |
| EP | 1656993 A1 | 5/2006 | |
| EP | 2441510 | 4/2012 | |
| JP | 62-20613 | 1/1987 | |
| JP | 4-215853 | 8/1992 | |
| JP | 09-271665 | * 10/1997 | ............ B01J 23/10 |
| JP | 4144174 | 9/2008 | |
| JP | 2013-27858 | 2/2013 | |
| PL | 404146 | 12/2014 | |
| WO | WO 90/07561 | 7/1990 | |
| WO | WO 94/11467 | 5/1994 | |
| WO | WO 95/02655 | 1/1995 | |
| WO | WO 97/04045 | 2/1997 | |
| WO | WO 97/09523 | 3/1997 | |
| WO | WO 97/28358 | 8/1997 | |
| WO | WO 97/36676 | 10/1997 | |
| WO | WO 98/22209 A1 | 5/1998 | |
| WO | WO 98/28070 A1 | 7/1998 | |
| WO | WO 00/30739 A1 | 6/2000 | |
| WO | WO 00/75643 A1 | 12/2000 | |
| WO | WO 01/85876 A1 | 11/2001 | |
| WO | WO 03/068363 A1 | 8/2003 | |
| WO | WO 2004/058641 A1 | 7/2004 | |
| WO | WO 2008/099847 | 8/2008 | |
| WO | WO 2009/139860 A1 | 11/2009 | |
| WO | WO 2010/029431 | 3/2010 | |
| WO | WO 2011/068509 A1 | 6/2011 | |
| WO | WO 2012/093600 | 7/2012 | |
| WO | WO 2012/166514 | 12/2012 | |
| WO | WO 2013/004814 | 1/2013 | |
| WO | WO 2013/028575 | 2/2013 | |
| WO | WO 2013/044115 | 3/2013 | |
| WO | WO 2013/068243 | 5/2013 | |
| WO | WO 2013/121112 | 8/2013 | |
| WO | WO 2013/153081 | 10/2013 | |
| WO | WO 2014/194101 A1 | 12/2014 | |
| WO | WO 2015/199687 A1 | 12/2015 | |
| WO | WO 2015/199688 A1 | 12/2015 | |
| WO | WO 2016/039747 A1 | 3/2016 | |

OTHER PUBLICATIONS

Azad et al. Examining the Cu-Mn-O Spinel System as an Oxygen Carrier in Chemical Looping Combustion, Energy Technology, vol. 1, Issue 1, (2013) 59-69.

Barrett, E. P. et al., The determination of pore volume and area distributions in porous substances. I. Computations from nitrogen isotherms, J. A. Chem. Soc. (1951) 73, 373-380.

Brunaubr, S. et al., Adsorption of Gases in Multimolecular Layers, J. Am. Chem. Soc. 1938, 60, 309-319.

Bugarski, Aleksandar, Exhaust Aftertreatment Technologies for Curtailment of Diesel Particulate Matter and Gaseous Emissions, Disesel Aerosols and Gases in Underground Metal and Nonmetal Mines. Power Point Presentation. 14th U.S./North American Mine Ventilation Symposium, Salt Lake City, Utah, Jun. 17, 2012. Slides 1-44. http://www.cdc.gov/niosh/mining/use.

D. Panayotov, "Interaction Between No, Co and O2 on gamma-Al203-Supported Copper-Manganese Oxides", 1996, React.Kinet.Catal.Lett. vol. 58, No. 1, 73-78.

Extended European Search Report for corresponding European Application No. 09770546.1 dated Sep. 26, 2012, 6 pages.

Extended European Search Report for corresponding European Application No. 09770547.9 dated Dec. 7, 2012, 5 pages.

Hayes et al., "Introduction to Catalytic Combustion", pp. 310-313, 1997 OPA (Overseas Publishers Association).

He, H. et al., An investigation of NO/CO reaction over perovskite-type oxide La0.8Ce0.2B0.4Mn0.6O3 (B=Cu or Ag) catalysts synthesized by reverse microemulsion, Catalysis Today, vol. 126 (2007) 290-295.

International Preliminary Report on Patentability (Chapter II) from International Application No. PCT/US2009/003800, dated May 11, 2010.

International Search Report and Written Opinion for corresponding International Application No. PCT/US2009/003799, dated Oct. 8, 2009.

International Search Report and Written Opinion for corresponding International Application No. PCT/US2009/003800 dated Oct. 22, 2009.

International Search Report and Written Opinion for corresponding International Application No. PCT/US2014/030597 dated Aug. 13, 7014.

International Search Report and Written Opinion for corresponding International Application No. PCT/US2014/033041 dated Aug. 20, 2014.

International Search Report and Written Opinion for corresponding International Application No. PCT/US2014/037452 dated Sep. 15, 2014.

International Search Report and Written Opinion for corresponding International Application No. PCT/US2014/044221, dated Oct. 3, 2014.

International Search Report and Written Opinion for corresponding International Application No. PCT/US2014/044222 dated Oct. 3, 2014.

International Search Report and Written Opinion for corresponding International Application No. PCT/US2014/046512 dated Apr. 6, 2015.

International Search Report and Written Opinion for corresponding International Application No. PCT/US2014/054874, dated Nov. 13, 2014.

International Search Report and Written Opinion for corresponding International Application No. PCT/US2014/055063 dated Nov. 24, 2014.

International Search Report and Written Opinion for corresponding International Application No. PCT/US2014/067541 dated Feb. 4, 2015.

International Search Report and Written Opinion for corresponding International Application No. PCT/US2014/067569, dated Apr. 3, 2015.

International Search Report and Written Opinion for corresponding International Application No. PCT/US2014/067589, dated Feb. 10, 2015.

(56) References Cited

OTHER PUBLICATIONS

International Search Report and Written Opinion for corresponding International Application No. PCT/US2015/025267 dated Jul. 2, 2015.
International Search Report and Written Opinion for corresponding International Application No. PCT/US2015/025299 dated Jul. 2, 2015.
Ishizaki, K. et al., A Study of PGM-Free Oxidation Catalyst YMnO3 for Diesel Exhaust Aftertreatment, SAE Technical Paper, (2012) http://papers.sae.org/2012-01-0365/.
K. S. Abdel Halim et al. "Catalytic Oxidation of CO Gas over Nanocrystallite CuxMn1-xFe2O4", Feb. 26, 2008, Top Catalyst (2008) 47:66-72.
Kucharczyk, B. et al., Partial substitution of lanthanum with silver in the LaMnO3 perovskite: Effect of the modification on the activity of monolithic catalysts in the reactions of methane and carbon oxide oxidation, Applied Catalysis A: General, vol. 335 (2008) 28-36.
Mestres, L. et al., Phase Diagram at Low Temperature of the System ZrO2/Nb2O5, Z.Anorg. Alig. Chem., vol. 627 (2001) 294-298.
Papavasilious et al., "Combined Steam reforming of methanol over Cu-Mn spinel oxide catalysts", Journal of Catalysis 251 (2007) 7-20.
Reddy et al., Selective Ortho-Methylation of Phenol with Methanol over Copper Manganese Mixed-Oxide Spinel Catalysts, Journal of Catalysis, vol. 243 (2006) 278-291.
Suh, J. K. et al., Characterization of transition metal-impregnated La-Al complex oxides for catalytic combustion, Microporous Materials (1995) 657-664.
Tanaka et al., "Influence of preparation method and additive for Cu-Mn spinel oxide catalyst on water gas shift reaction of reformed fuels", Applied Catalysis A: General 279 (2005) 59-66.
Wei, P. et al., In situ high-temperature X-ray and neutron diffraction of Cu-Mn oxide phases, J. Mater Sci. (2010) 45: 1056-1064.

\* cited by examiner

FIRING (CALCINATION) PROCESS AND METHOD RELATED TO METALLIC SUBSTRATES COATED WITH ZPGM CATALYST

CROSS-REFERENCE TO RELATED APPLICATIONS

This application claims priority to U.S. Provisional Application No. 61/791,721, filed Mar. 15, 2013, titled Methods for Oxidation and Three-way ZPGM Catalyst Systems and Apparatus Comprising Same and to U.S. Provisional Application No. 61/791,838, filed Mar. 15, 2013, titled Oxidation Catalyst Systems Compositions and Methods Thereof, and U.S. Provisional Application No. 61/791,963, filed Mar. 15, 2013, titled System and Method for Two Way ZPGM Oxidation Catalyst Systems and U.S. Provisional Application No. 61/792,071, filed Mar. 15, 2013, titled ZPGM Catalyst Systems and Methods of Making Same, and U.S. Provisional Application No. 61/792,215, filed Mar. 15, 2013, titled ZPGM TWC Systems Compositions and Methods Thereof, the entireties of which are incorporated herein by reference as if set forth herein.

BACKGROUND

1. Technical Field

This disclosure relates generally to ZPGM catalyst systems, and, more particularly, to firing (calcination) effect on ZPGM catalyst coated on metallic substrates.

2. Background Information

The catalytic properties of ZPGM catalyst systems may significantly depend on the structure of a precursor and its preparation method. Under some conditions, high dispersion metal components systems may be obtained by thermal decomposition (calcination) of precursor material. For this reason, calcination (firing) process may be an important step in the process of catalyst activation.

Calcination may have an effect on physiochemical properties and catalytic activity within a catalyst system. Noble metals such as Pt, Pd, and Rh, amongst others may have shown high activity for hydrocarbon combustion and tolerance to moisture, but due to their resource scarcity and high cost may have encountered limits in practical applications. ZPGM catalyst systems may be an alternative due to their cost and resistance to poisoning. However, single component transition metal oxides may have a low thermal stability and activity which may be increased by doping the transition metal oxide catalyst with metal oxides.

As calcination cycling may affect the crystalline phase, crystallite size and/or the surface area of the active phase, an optimal calcination cycling may be needed for enhanced catalyst performance and activity, which may also provide additional savings in energy and cost in the preparation of ZPGM catalyst systems.

SUMMARY

The present disclosure may provide a calcination or firing cycle for enhanced performance and activity of ZPGM catalyst systems on metallic substrates.

Compositions of ZPGM catalyst systems may include any suitable combination of a substrate, a washcoat, and an overcoat which includes copper (Cu), cerium (Ce), and other metal combinations for catalysts that may be practically free of platinum group metals to form mixed phase of metal oxide and spinel catalysts.

A calcination cycle may be provided employing samples of varied substrate geometry and cells per square inch (CPSI). Samples may be prepared using any suitable synthesis method as known in current art, such as co-precipitation or impregnation methods, amongst others. Catalyst samples may be subjected to a calcination cycle employing a plurality of calcinating equipment such as a static furnace, amongst others after drying process at room temperature. Both washcoat and overcoat of catalytic samples may separately go through a calcination cycle which may include the application of normal, slow and fast firing cycles. The time required for the normal firing cycle may be used to determine cycle times required for the slow and fast firing cycles respectively.

The catalyst samples may be subsequently characterized using any suitable analysis, such as elemental mass balance analysis, which may provide profiles of the effect of calcination ramp on catalyst performance, activity and washcoat adhesion (WCA) according to principles in present disclosure.

The determination of an optimal firing, calcination cycling, may provide savings on energy and cost in the preparation of ZPGM catalyst systems.

Numerous objects and advantages of the present disclosure may be apparent from the detailed description that follows and the drawings which illustrate the embodiments of the present disclosure, and which are incorporated herein by reference.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

DETAILED DESCRIPTION

In the following detailed description, reference is made to the accompanying drawings, which form a part hereof. In the drawings, which are not to scale or to proportion, similar symbols typically identify similar components, unless context dictates otherwise. The illustrative embodiments described in the detailed description, drawings and claims, are not meant to be limiting. Other embodiments may be used and/or and other changes may be made without departing from the spirit or scope of the present disclosure.

Definitions

As used here, the following terms have the following definitions:

"Washcoat" may refer to at least one coating including at least one oxide solid that may be deposited on a substrate.

"Overcoat" may refer to at least one coating that may be deposited on at least one washcoat layer.

"Zero platinum group (ZPGM) catalyst" may refer to a catalyst completely or substantially free of platinum group metals.

"Conversion" may refer to the chemical alteration of at least one material into one or more other materials.

"Calcination" may refer to a thermal treatment process applied to solid materials, in presence of air, to bring about a thermal decomposition, phase transition, or removal of a volatile fraction at temperatures below the melting point of the solid materials.

Description of the Drawings

Various example embodiments of the present disclosure are described more fully with reference to the accompanying drawings in which some example embodiments of the present disclosure are shown. Illustrative embodiments of the present disclosure are disclosed herein. However, specific structural and functional details disclosed herein are merely representative for purposes of describing example embodiments of the present disclosure. This disclosure however, may be embodied in many alternate forms and should not be construed as limited to only the embodiments set forth herein.

Preparation of Samples

A ZPGM catalyst system including a ZPGM transition metal catalyst having a metallic substrate, a washcoat (WC) and an overcoat (OC) is prepared. Metallic substrate may be used with different dimension and cell density (CPSI). Washcoat may include an oxygen storage material (OSM) and support oxide. Overcoat may include copper oxide, ceria, support oxide, and at least one OSM. The OSM is a mixture of cerium, zirconium, neodymium, and praseodymium. The support oxide may include any type of alumina or doped alumina. The OSM and the alumina may be present in WC in a ratio between 40% and about 60% by weight. The alumina and OSM included in OC are present in a ratio of about 60% to about 40% by weight. The copper (Cu) and cerium (Ce) in OC are present in about 5% to about 50% by weight or from about 10% to 16% by weight of Cu and 12% to 20% by weight of Ce. The ZPGM catalyst system may be prepared using co-milling, co-precipitation or other preparation technique known in the art. After deposition, washcoat and overcoat undergo a thermal treatment called calcination (or firing). This thermal treatment may be performed at about 300° C. to about 700° C. In some embodiments this treatment may be performed at about 550° C. The heat treatment may last from about 2 to about 6 hours. In an embodiment the treatment may last about 4 hours. However, the ramp of heating treatment may vary in some embodiments. The washcoat and overcoat loading may vary from 60 g/L to 200 g/L, separately.

Calcination (Firing) Process

The calcination process for the WC and OC of ZPGM catalyst samples may be separately examined by any suitable analytical method using a bench reactor or a static furnace as known in the art. The samples may be subjected to at least two different firing cycles, namely slow firing cycle and fast firing cycle which may be determined from a normal firing cycle. Suitable time for normal firing cycle may be selected within a range of about 5 hours to 6 hours within a temperature range from room temperature and 600° C., preferably up to 550° C. Temperature may be measured with any suitable thermocouple that may be placed at the inlet center of the sample substrate. A suitable required cycle time for the slow firing cycle may be 150% of time required for normal firing cycle and temperature range from 50° C. and 600° C., preferably up to 550° C., measured with any suitable thermocouple that may be placed at the inlet center of the sample substrate. For fast firing cycle, a suitable required time may be 50% of time required for normal firing cycle and temperature range from room temperature and 600° C., preferably up to 550° C., measured with any suitable thermocouple. For each of the firing cycles in present disclosure, calcination ramp may be between 100° C./hr to 180° C./hr.

The samples may be subsequently characterized using any suitable analytical method such as elemental mass balance analysis, which may provide catalyst performance and activity profiles in present disclosure. The catalyst samples may be tested under exhaust lean condition to obtain profiles of the effect of calcination ramp on catalyst performance, activity and WCA loss according to principles in present disclosure.

The following examples are intended to illustrate the scope of the disclosure. It is to be understood that other procedures known to those skilled in the art may alternatively be used.

Example #1

Calcination Cycling of ZPGM Catalyst Samples on Bench Reactor

Example #1 illustrates calcination cycling for the ZPGM catalyst samples on metallic substrate. The metallic substrate specification is D40 mm×L40 mm, and 100 CPSI. Washcoat contains $Al_2O_3$ with a loading of 120 g/L and overcoat contains alumina, OSM, and Cu (12.0 g/L) and Ce (14.4 g/L) as ZPGM catalyst. The total loading of overcoat is 120 g/L.

After washcoat step, samples may be dried at room temperature, they may be subjected to either normal, fast or slow firing cycling in a bench reactor. A suitable thermocouple may be placed at the inlet center of the catalyst sample substrate. Composition of gas flow may be 5% $O_2$ in $N_2$. For the normal firing cycle, sample is heated from room temperature to about 150° C. with temperature ramp of 120° C./hr, followed by soaking at 150° C. for about 2 hours. Then, temperature may be increased to about 550° C. with a temperature ramp of 180° C./hr, followed by soaking at 550° C. for desired treatment duration between 2 hours to 6 hours, preferably 4 hours. For the fast firing cycle, sample is heated from room temperature to about 550° C. with temperature ramp of 180° C./hr, followed by soaking at 550° C. for desired treatment duration between 2 hours to 6 hours, preferably 4 hours. For the slow firing cycle, sample is heated from room temperature to about 150° C. with temperature ramp of 120° C./hr, followed by soaking at 150° C. for about 2 hours. Then, temperature may be increased to about 300° C. with a temperature ramp of 120° C./hr, followed by soaking at 300° C. for about 2 hours. Afterwards, temperature may be increased to about 550° C. with a temperature ramp of 120° C./hr, followed by soaking at 550° C. for desired treatment duration between 2 hours to 6 hours, preferably 4 hours.

Monitoring the outlet stream products after firing of washcoat layer resulted in that no CO, $CO_2$, HC, and $NO_x$ were detected. Only a WC weight loss was observed to be of 0.42% weight loss during slow firing cycle and of 0.44% weight loss during fast firing cycle, mostly due to the presence of water in the samples.

Subsequently, samples with overcoat may be dried at room temperature and then they may be subjected to either normal, fast or slow firing cycling in a bench reactor. A suitable thermocouple may be placed at the inlet center of the catalyst sample substrate. Composition of gas flow may be 5% $O_2$ in $N_2$. For the normal firing cycle, sample is heated from room temperature to about 150° C. with temperature ramp of 120° C./hr, followed by soaking at 150° C. for about 2 hours. Then, temperature may be increased to about 550° C. with a temperature ramp of 180° C./hr, followed by soaking at 550° C. for desired treatment duration between 2 hours to 6 hours, preferably 4 hours. For the fast firing cycle, sample is heated from room temperature to about 550° C. with temperature ramp of 180° C./hr, followed by soaking at 550° C. for desired treatment duration between 2 hours to 6 hours, preferably 4 hours. For the slow firing cycle, sample is heated from room temperature to about 150° C. with temperature ramp of 120° C./hr, followed by soaking at 150° C. for about 2 hours. Then, temperature may be increased to about 300° C. with a temperature ramp of 120° C./hr, followed by soaking at 300° C. for about 2 hours. Afterwards, temperature may be increased to about 550° C. with a temperature ramp of 120° C./hr, followed by soaking at 550° C. for desired treatment duration between 2 hours to 6 hours, preferably 4 hours.

Monitoring the outlet stream products after firing of overcoat layer resulted in that $CO_2$, HC, and $NO_x$ were detected. However, no CO was detected. An OC weight loss was observed to be of 2.3% weight loss during slow firing cycle and of 2.0% weight loss during fast firing cycle. From the above, the WC and OC weight loss is the same regardless of the firing ramp cycle. Therefore, the firing ramp cycle may not affect WC and OC weight loss.

Figure 1:
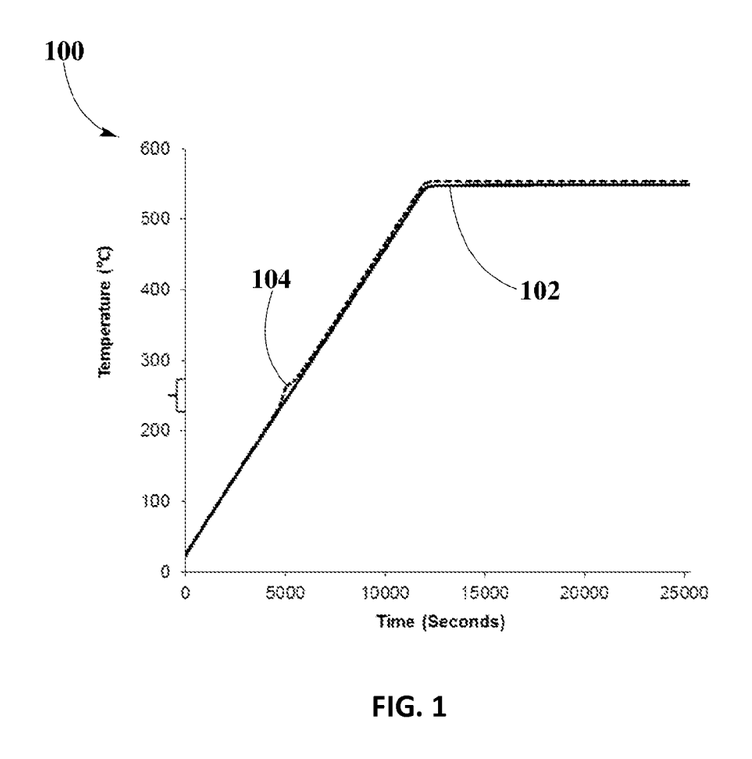
FIG. 1 shows a temperature profile for a washcoat (WC) and an overcoat (OC) calcined in a bench reactor using a fast firing cycle, according to an embodiment.

FIG. 1 shows temperature profile 100 for catalyst of example #1 calcined in a bench reactor, employing a fast firing cycle. Graph 102 (solid line) is for WC firing cycle and graph 104 (dash line) is for OC firing cycle. As may be seen in graph 102, consistent with the result of the monitoring of the fast firing cycle of WC layer no exotherm was detected. In graph 104, during fast firing cycle of OC layer, $CO_2$, HC, and $NO_x$ may be detected as indicated by the OC exothermic reaction that may occur at temperatures in between the range of 200° C. to 300° C., after approximately 1.5 hours of calcination time.

Figure 2:
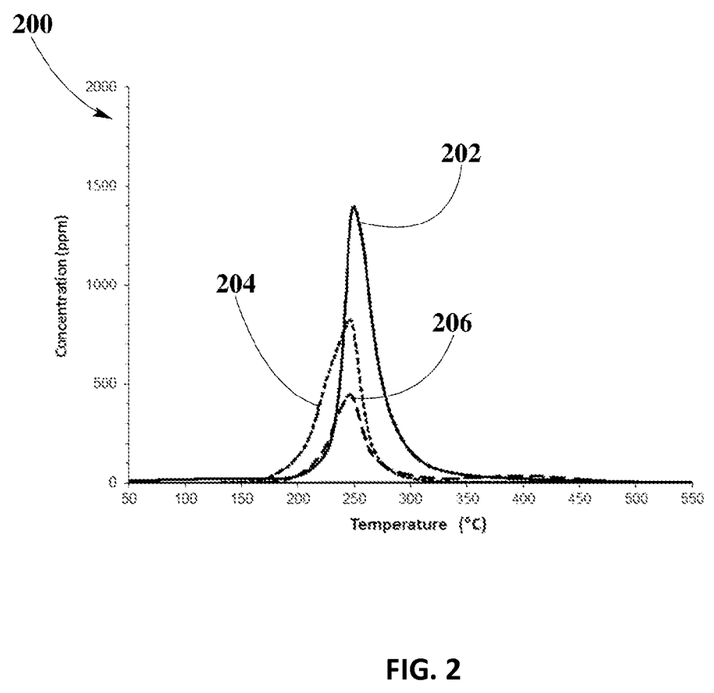
FIG. 2 illustrates elemental mass balance analysis for an OC under a fast firing cycle, according to an embodiment.

FIG. 2 illustrates elemental mass balance analysis 200 for catalyst of example #1 calcined in a bench reactor, employing a fast firing cycle, according to an embodiment. Concentration of $CO_2$, HC, and $NO_x$ may be seen in CO2 concentration graph 202, HC concentration graph 204, and NOx concentration graph 206.

Consistent with the OC exothermic reaction that may be observed in FIG. 1, elemental mass balance analysis 200 resulted in that no CO was formed during OC firing. As may be seen in CO2 concentration graph 202, $CO_2$ was detected at a temperature of about 250° C. in a maximum concentration of 1,400 ppm. At the same temperature, in HC concentration graph 204 may be seen that HC detected was present in a maximum concentration of about 800 ppm. CO2 and HC are combustion products of the organic compounds used for rheology adjustment during preparation of overcoat slurry, including but not limited to acetic acid, citric acid, tetraethyl ammonium hydroxide, other tetralkyl ammonium salts, ammonium acetate, and ammonium citrate.

$NO_x$ detected in a maximum concentration of about 500 ppm may come from the nitrate source of base metals used, such as Cu nitrate and Ce nitrate, as seen in NOx concentration graph 206.

Figure 3:
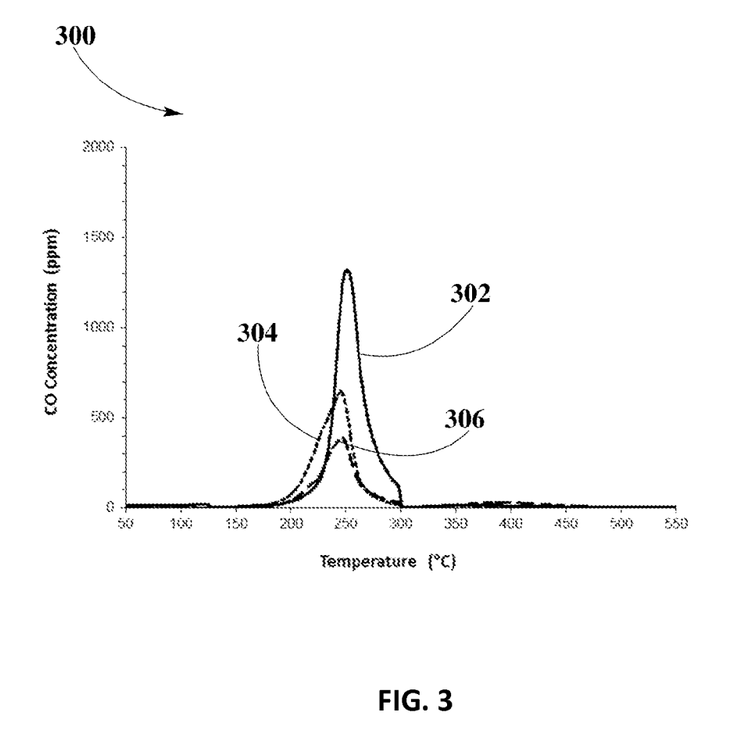
FIG. 3 presents elemental mass balance analysis for an OC under a slow firing cycle, according to an embodiment.

FIG. 3 presents elemental mass balance analysis 300 for catalyst of example #1 calcined in a bench reactor, employing a slow firing cycle, according to an embodiment.

Concentration of $CO_2$, HC, and $NO_x$ may be seen in CO2 concentration graph 302, HC concentration graph 304, and NOx concentration graph 306.

Consistent with the OC exothermic reaction that may be observed, elemental mass balance analysis 300 resulted in that no CO was formed during OC firing. As may be seen in CO2 concentration graph 302, $CO_2$ was detected at a temperature of about 250° C. in a maximum concentration of 1,300 ppm. At the same temperature, in HC concentration graph 304 may be seen that HC detected was present in a maximum concentration of about 700 ppm. CO2 and HC are combustion products of the organic compounds used for rheology adjustment during preparation of overcoat slurry, including but not limited to acetic acid, citric acid, tetraethyl ammonium hydroxide, other tetralkyl ammonium salts, ammonium acetate, and ammonium citrate.

$NO_x$ detected in a maximum concentration of about 400 ppm may come from the nitrate source of base metals used, such as Cu nitrate and Ce nitrate, as seen in NOx concentration graph 306. These results show the OC exotherm does not depend on the firing ramp. The temperature of OC exotherm and the amount of exotherm does not change by varying the calcination ramp cycle.

Effect of Calcination Ramp on Catalytic Property

Figure 4A:
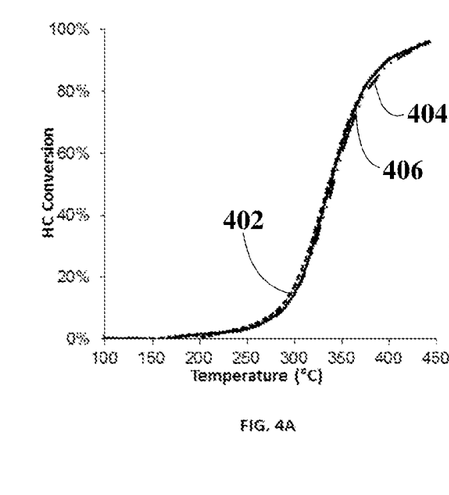
FIG. 4 depicts effect of calcination ramp on catalyst performance under exhaust lean condition, according to an embodiment.

FIG. 4 depicts effect of calcination ramp 400 on activity of catalyst of example #1 under exhaust lean condition, according to an embodiment. Catalyst activity may be shown by HC light-off curve of catalyst of example #1 which goes under normal, fast, and slow calcination ramp in FIG. 4A. Catalyst activity graph 402 shows normal calcination ramp (dash line), catalyst activity graph 404 shows fast calcination ramp (dot dash line), and catalyst activity graph 406 shows slow calcination ramp (solid line). As may be seen in FIG. 4A, T50 of HC is about 338° C. for all three calcination cycles. Therefore, the firing cycles applied may have no effect on the HC conversion of the catalyst samples.

Figure 4B:
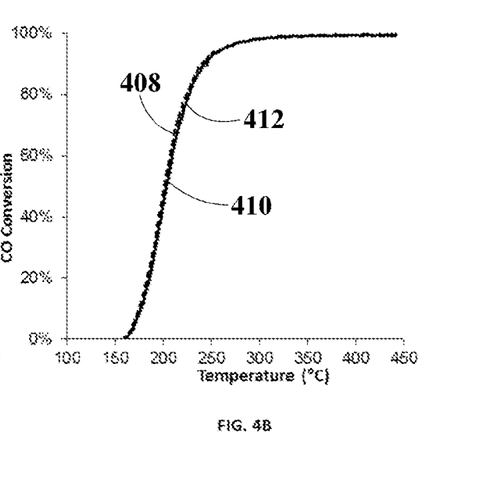

Catalyst activity may be shown by CO light-off curve of catalyst of example #1 which goes under normal, fast, and slow calcination ramp in FIG. 4B. Catalyst activity graph 408 shows normal calcination ramp (dash line), catalyst activity graph 410 shows fast calcination ramp (dot line), and catalyst activity graph 412 shows slow calcination ramp (solid line). As may be seen in FIG. 4B, T50 of CO is about 203° C. for all three calcination cycles. Therefore, the firing cycles applied may have no effect on the sample catalyst activity in CO conversion.

Figure 5:
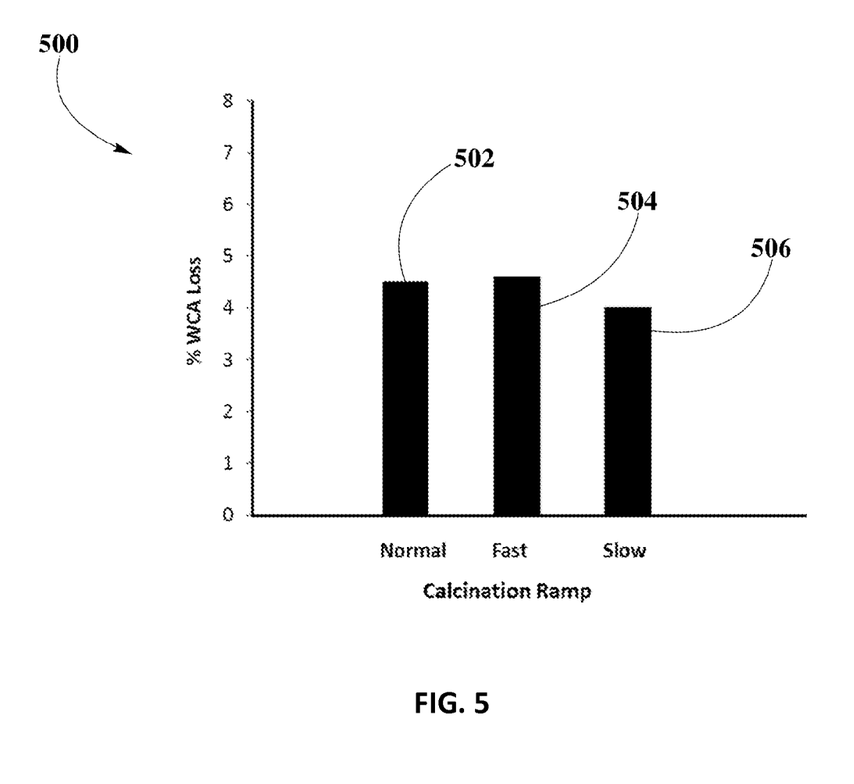
FIG. 5 shows effect of calcination ramp on WCA loss of ZPGM samples, according to an embodiment.

FIG. 5 shows effect of calcination ramp 500 on WCA loss of samples of example #1 which goes under normal, fast, and slow calcination ramp, according to an embodiment. Bar graph 502 shows WCA loss of catalyst of example #1 with normal calcination ramp. Bar graph 504 shows WCA loss of catalyst of example #1 with fast calcination ramp and bar graph 506 shows WCA loss of catalyst of example #1 with slow calcination ramp on catalyst samples. As may be seen, after firing cycles were applied, catalyst samples showed WCA loss in a range of about 4% to 5%, which also indicates that the variation of firing cycles may have no effect of WCA loss.

Example #2

Calcination Cycling of ZPGM Catalyst Samples in Static Furnace

Example #2 illustrates calcination cycling for the ZPGM catalyst samples on metallic substrate. The metallic substrate specification is D40 mm×L90 mm, and 300 CPSI. Washcoat contains $Al_2O_3$ with a loading of 120 g/L and overcoat contains alumina, oxygen storage material, and Cu (12.0 g/L) and Ce (14.4 g/L) as ZPGM catalyst. The total loading of overcoat is 120 g/L.

After washcoat and overcoat process, samples may be dried at room temperature, they may be subjected to either normal or slow firing cycling in a static furnace under air flow. For the normal firing cycle, sample is heated from room temperature to about 150° C. with temperature ramp of 120° C./hr, followed by soaking at 150° C. for about 2 hours. Then, temperature may be increased to about 550° C. with a temperature ramp of 180° C./hr, followed by soaking at 550° C. for desired treatment duration between 2 hours to 6 hours, preferably 4 hours. For the slow firing cycle, sample is heated from room temperature to about 150° C. with temperature ramp of 120° C./hr, followed by soaking at 150° C. for about 2 hours. Then, temperature may be increased to about 300° C. with a temperature ramp of 120° C./hr, followed by soaking at 300° C. for about 2 hours. Afterwards, temperature may be increased to about 550° C. with a temperature ramp of 120° C./hr, followed by soaking at 550° C. for desired treatment duration between 2 hours to 6 hours, preferably 4 hours.

Figure 6:
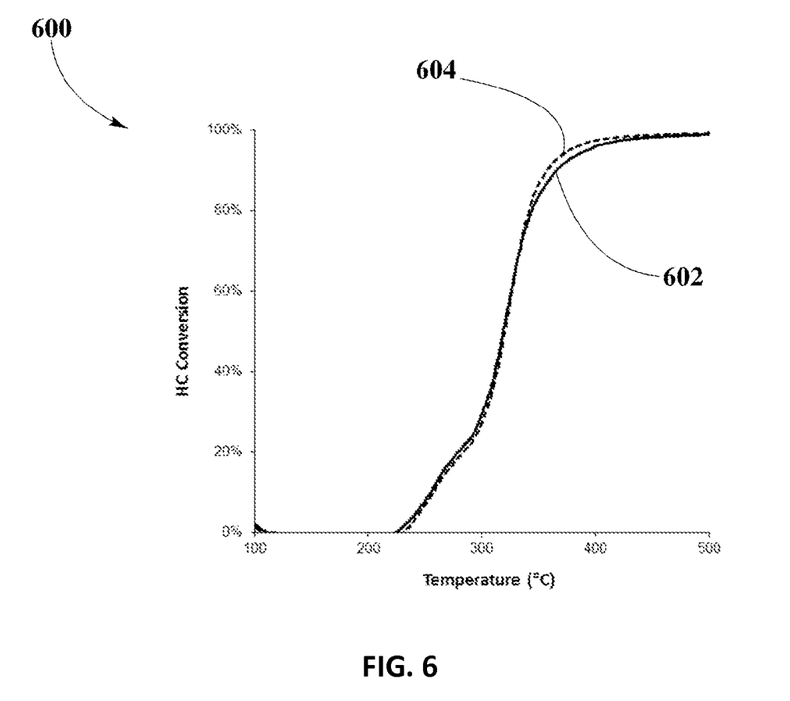
FIG. 6 presents activity for ZPGM catalyst sample on metallic substrate, according to an embodiment.

FIG. 6 presents effect of calcination ramp 600 on activity of catalyst example #2 under exhaust lean condition, according to an embodiment. Catalyst activity may be shown by HC light-off curve of catalyst of example #2 which goes under normal and slow calcination ramp. Catalyst activity graph 602 shows normal calcination ramp (solid line), and catalyst activity graph 604 shows slow calcination ramp (dash line). As may be seen in FIG. 6, T50 of HC is about 319° C. for sample treated by normal and slow firing cycle; therefore the normal and slow firing cycles applied may have no effect on the activity in HC conversion of the catalyst samples. Additionally to HC conversion, WCA loss may be examined. During normal calcination cycle, catalyst samples showed a WCA loss of about 4.2% and during slow calcination cycle, samples showed a WCA loss of about 4.6%. It may be observed that using a slower calcination cycle for samples OC may not influence the catalyst WCA and activity.

As seen from example #1 and example #2, WC and OC weight loss may be minimal during the calcination cycle and may not depend on the ramp of calcination cycle. The temperature and amount of the exothermic reaction that was observed during the calcination cycle may not depend on the ramp of calcination cycle. The calcination cycle may not affect the catalyst activity and washcoat adhesion. These results may be applied for different size and cell density of metallic substrates.

While various aspects and embodiments have been disclosed, other aspects and embodiments may be contemplated. The various aspects and embodiments disclosed here are for purposes of illustration and are not intended to be limiting, with the true scope and spirit being indicated by the following claims.

What is claimed is:

1. A method of controlling a firing cycle for use with catalytics, comprising:
    providing at least one substrate;
    depositing a washcoat suitable for deposition on the substrate, the washcoat comprising at least one oxide solid further comprising at least one carrier metal oxide;
    calcinating the washcoat through at least one first heating and at least one second heating;
    depositing an overcoat suitable for deposition on the substrate, the overcoat comprising at least one oxygen storage material and at least one ZPGM catalyst;
    wherein the at least one ZPGM catalyst comprises at least one compound having the formula $AB_2O_4$, wherein each of A and B is selected from the group consisting of at least one of copper and cerium; and
    wherein one of the at least one carrier metal oxide is a mixed metal oxide.

2. The method of claim 1, wherein the mixed metal oxide is selected from the group consisting of $TiO_2$, doped $TiO_2$, $Ti_{1-x}Nb_xO_2$, $SiO_2$, alumina, doped alumina, $ZrO_2$, doped $ZrO_2$, $Nb_2O_5$-$ZrO_2$, $Nb_2O_5$-$ZrO_2$-$CeO_2$, and combinations thereof.

3. The method of claim 1, wherein the at least one ZPGM catalyst comprises about 12.0 g/L of copper and about 14.4 g/L of cerium.

4. The method of claim 1, wherein the mixed metal oxide has a concentration of about 120 g/L.

5. The method of claim 1, wherein the at least one first heating is from about room temperature to about 150° C.

6. The method of claim 5, wherein the rate of the at least one first heating is about 120° C/hr.

7. The method of claim 5, wherein the temperature of about 150° C. is held for about 2 hours.

8. The method of claim 1, wherein the at least one second heating is to about 550° C.

9. The method of claim 5, wherein the rate of the at least one second heating is about 180° C/hr.

10. The method of claim 5, wherein the temperature of about 550° C. is held for about 4 hours.

11. The method of claim 1, wherein the at least one second heating is to about 300° C.

12. The method of claim 11, wherein the rate of the at least one second heating is about 120° C/hr.

13. The method of claim 11, wherein the temperature of about 300° C. is held for about 2 hours.

14. The method of claim 1, further comprising at least one third heating, wherein the at least one third heating is to about 550° C.

15. The method of claim 14, wherein the rate of the at least one third heating is about 120° C/hr.

16. The method of claim 14, wherein the temperature of about 550° C. is held for about 4 hours.

17. The method of claim 1, wherein the at least one substrate may be selected from the group consisting of cordierite, zeolite, and combinations thereof.

18. The method of claim 1, further comprising calcinating the overcoat through at least one first heating and at least one second heating.

19. A method of controlling a firing cycle for use with catalytics, comprising:
    providing at least one substrate;
    depositing a washcoat suitable for deposition on the substrate, the washcoat comprising at least one oxide solid further comprising at least one carrier metal oxide;
    calcinating the washcoat through at least one heating, wherein the at least one heating is from about room temperature to about 550° C. and wherein the temperature of about 550° C. is held for about 4 hours;
    depositing an overcoat suitable for deposition on the substrate, the overcoat comprising at least one oxygen storage material and at least one ZPGM catalyst;
    wherein the at least one ZPGM catalyst comprises at least one compound having the formula $AB_2O_4$, wherein each of A and B is selected from the group consisting of at least one of copper and cerium; and wherein one of the at least one carrier metal oxide is a mixed metal oxide.

20. The method of claim 19, further comprising calcinating the overcoat through at least one heating, wherein the at least one heating is from about room temperature to about 550° C. and wherein the temperature of about 550° C. is held for about 4 hours.

\* \* \* \* \*

UNITED STATES PATENT AND TRADEMARK OFFICE
CERTIFICATE OF CORRECTION

PATENT NO. : 9,511,353 B2  
APPLICATION NO. : 13/912011  
DATED : December 6, 2016  
INVENTOR(S) : Nazarpoor Page 1 of 1

It is certified that error appears in the above-identified patent and that said Letters Patent is hereby corrected as shown below:

On the Title Page

Item (73) Assignee: "Clean Diesel Technologies, Inc. (CDTI), Oxnard, CA (US)" should read --Clean Diesel Technologies, Inc., Oxnard, CA (US)--.

Signed and Sealed this  
Eleventh Day of July, 2017

Joseph Matal  
*Performing the Functions and Duties of the*  
*Under Secretary of Commerce for Intellectual Property and*  
*Director of the United States Patent and Trademark Office*